Nov. 3, 1959 D. W. E. WHEELE 2,911,464

FACSIMILE TELEGRAPH SYSTEMS

Filed Nov. 17, 1955 2 Sheets-Sheet 1

Inventor
D.W.E.Wheele
By Glascock Downing & Seebold
Attys.

Inventor
D. W. E. Wheele
By Glascock Downing & Seebold
Attys.

2,911,464

FACSIMILE TELEGRAPH SYSTEMS

Douglas Walter Edmund Wheele, Chadwell Heath, Romford, England, assignor to Muirhead & Co. Limited, Elmers End, Beckenham, Kent, England Application November 17, 1955, Serial No. 547,515

5 Claims. (Cl. 178—6.6)

Figures 1, 2:
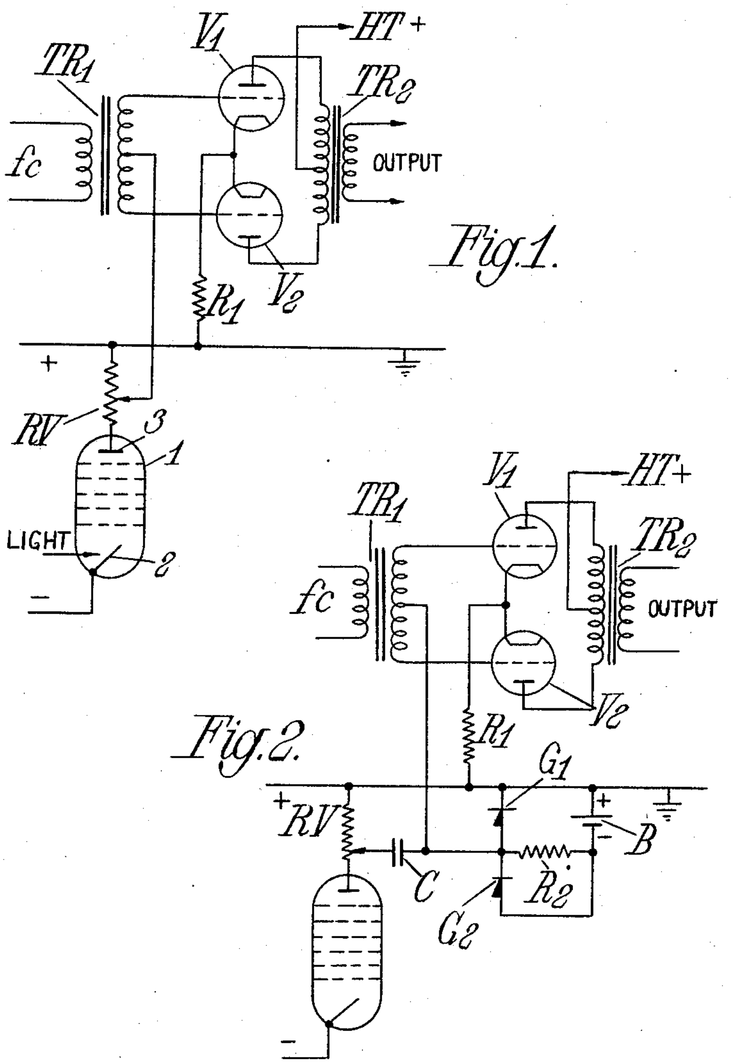

This invention relates to facsimile or copying-telegraph systems. In such a system in order to effect transmission the original picture or document is clamped around a drum in the transmitting machine. A spot of light from an illuminating system is concentrated on to the drum and the light emitted from the original, which corresponds to the tone of the area upon which the light is falling, is directed by a lens system to the photo-cathode of a photo-electric cell. The drum is rotated and moved axially with respect to the illuminating system so that the whole area of the original is progressively scanned. The output of the photo-electric cell is used to modulate the transmitter carrier. At the receiving end the carrier signal is demodulated and applied to electrodes for marking the electro-sensitive paper.

Such systems are frequently used for the reproduction of pictorial matter and in order to secure the highest quality in the reproduction it is important that the system should faithfully reproduce the full range of tones in the original between white and black.

An alternative and important use for such systems is in reproducing documents of all types and such documents may be written or printed on bases having different colours or tones, for example pure white, buff-coloured or pale blue paper. If the receiver makes a faithful reproduction of such documents then those having a base which is not pure white will be reproduced with an unpleasant background of a dirty white or grey tone. In order to avoid this effect it has previously been proposed to take a middle grey tone as a dividing line and arrange the system so that anything darker than this tone is reproduced as black and anything lighter is reproduced as white. There are, however, types of document, for example weather maps, which may have shaded areas or lines in both full black and a lighter tone and it is desirable that the system should differentiate between these, whilst still producing a pure white background.

An object of the present invention is to provide a circuit and a method of operation for a facsimile system such that the reproduction has a pure white background even if the background of the original is not pure white.

A further object of the invention is to provide a facsimile telegraph system which will give a reproduction having a white background and a full range of tones between white and black corresponding to a selected and variable range of tones in the original between the background tone and black.

Another object of the invention is to provide a compensating circuit for use in a facsimile telegraph system which will automatically adjust itself to transmit a "white" signal for the background tone of the original and signals corresponding to a full range of tones between white and black related to a selected range of tones in the original.

A still further object of the invention is to provide automatic means to compensate for changes in sensitivity of a photo-electric multiplier cell used in a facsimile telegraph transmitter.

The invention consists of a facsimile telegraph system having a compensating circuit which automatically adjusts itself so that a "white" record is produced for any shade of background tone in the original document and a record ranging between "white" and "black" corresponding to a pre-selected range of tones in the original.

Thus a facsimile telegraph transmitter is arranged to have a compensation circuit between the photo-electric cell and the modulator which automatically adjusts itself so that the modulator produces a signal corresponding to white for any shade of background tone in the original document and signals ranging between white and black corresponding to a pre-selected range of tones in the original.

Alternatively a facsimile telegraph receiver may be arranged to have a line or compensating circuit between the demodulated and the working electrodes.

The invention will be further described with reference to the embodiments shown in the accompanying drawing which are by way of example.

Figure 3:
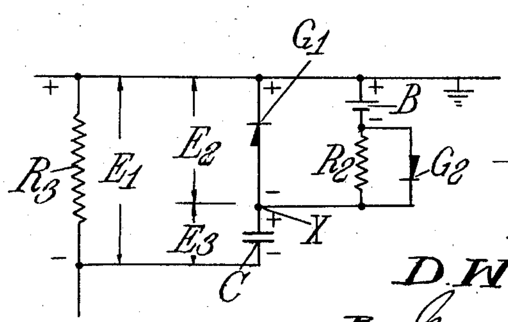
Figure 4:
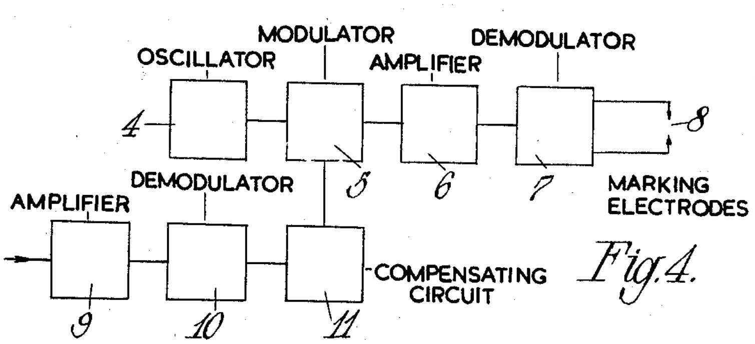
Figure 5:
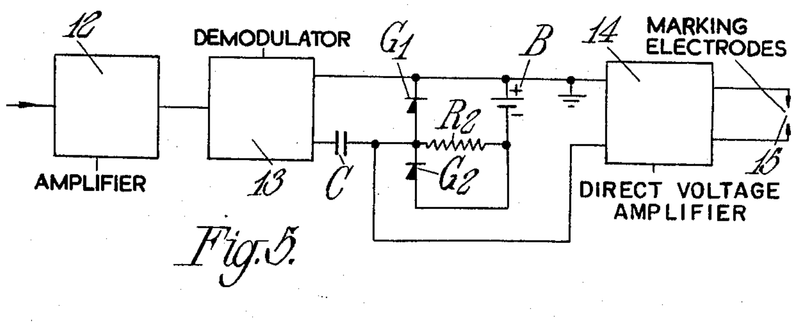
Figure 6:
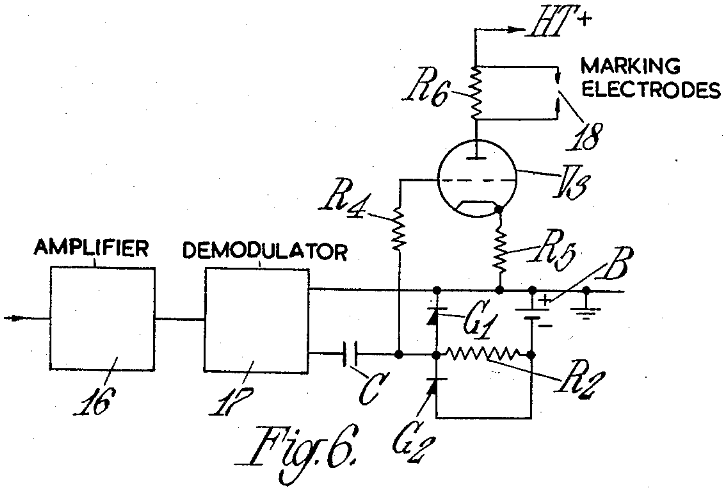

Figure 1 shows a balanced modulator circuit suitable for use in a facsimile transmitter, Figure 2 shows the same modulator circuit with the addition of a compensating circuit according to the invention and, Figure 3 shows the same compensating circuit redrawn to assist explanation, Figure 4 shows the compensating circuit applied to a facsimile receiver, Figure 5 shows another method of applying the compensating circuit to a facsimile receiver and, Figure 6 shows a further method of applying the compensating circuit to a facsimile telegraph receiver.

Referring to Figure 1 a photo-electric multiplier cell 1 is arranged so that the positive pole of its power supply is at earth potential. The method of connecting and operating such a cell is well known in the art and does not require further description. The current passing through photo-multiplier cell 1 is dependent upon the amount of or light falling upon photo-cathode 2, being very small when photo-cathode 2 is dark and reaching its maximum when the said photo-cathode is brightly illuminated. A potentiometer RV is connected in series with anode 3 and any proportion of the voltage across RV may be tapped off by means of its slider. The voltage between the slider of RV and the earth line will thus vary from practically zero when photo-cathode 2 is dark to any desired maximum when photo-cathode 2 is brightly illuminated.

A voltage at the desired carrier frequency is provided by an oscillator (not shown) applied to the primary of transformer TR1 which has a centre-tapped secondary to which the slider of RV is connected. Two valves V1 and V2 each having a cathode, a grid and an anode have their grids connected to the outer ends of the secondary of transformer TR1 and their cathodes connected to the earth line through bias resistor R1. The anodes of V1 and V2 are connected to the outer ends of the primary winding of output transformer TR2, the secondary of which supplies the output signal.

In operation the circuit is required to produce a carrier of frequency $fc$ whose amplitude varies inversely with the amount of light falling on photo-cathode 2, that is to say, the amplitude of the carrier is a maximum when photo-cathode 2 is dark and a minimum when photo-cathode 2 is brightly illuminated. The modulated carrier signal derived from the secondary of transformer TR2 is applied to an amplifier (not shown) and may then be transmitted over a land line or may be further amplified and used to modulate the carrier of a radio transmitter. In the receiver the signal is amplified and demodulated, and the resulting direct voltage is applied to the electro-sensitive recording paper. If this voltage is zero or very low no mark is made on the recording paper (thus leaving a white background) whilst if the voltage is higher a mark is made ranging in tone through grey to black according to the magnitude of the voltage.

The carrier voltage applied to the primary of transformer TR1 is modulated by varying the bias applied to valves V1 and V2. If photo-cathode 2 is dark the slider of RV is practically at earth potential and the bias of the valves is determined by bias resistor R1, which is chosen to provide the desired maximum carrier amplitude in the secondary of TR2. As the illumination of photo-cathode 2 is increased the slider of RV goes increasingly negative, thus increasing the bias of V1 and V2 and reducing the amplitude of the output from TR2 until a minimum is reached corresponding to white on the transmitter drum. The output amplitude corresponding to a white signal may be adjusted by means of the slider of RV. By using the balanced push-pull arrangement shown the light modulation frequency, that is, the frequency of the light variations on photo-cathode 2, is balanced out and the output consists only of the carrier frequency *fc* modulated in accordance with the illumination of photo-cathode 2.

In practice the optical system is set to "see" the lightest tone on the drum, which incidentally might be a uniform background tone. By means of RV the voltage corresponding to the above tone, which is applied negatively to the modulator input, is adjusted to give zero output from the modulator corresponding to a "white" signal. Thus, in the case of a uniform background tone this will be transmitted as white and a full range of tones darker than the background tone will be faithfully transmitted.

Figure 2 shows the same modulator circuit with the addition of the compensating circuit according to the invention. A capacitor C is inserted between the slider of RV and the centre tap of the secondary of TR1 and two rectifiers G1 and G2 are connected in series across a source of voltage B, the junction between the rectifiers being connected to the centre tap of the secondary of TR1. Voltage source B is arranged so that it is negative to earth and rectifiers G1 and G2 are connected in such a sense as to oppose the flow of current from voltage source B. Rectifier G2 is shunted by a resistance R2 which is high in relation to that of potentiometer RV.

Referring to Figure 3, potentiometer RV has been replaced by a fixed resistance R3 and voltage source B is also shown as being constant although it will be understood that either or both may be made variable. The voltage across resistance R3 is designated E1 and that between the earth line and point X, which is the bias applied to valves V1 and V2, is designated E2. The voltage across capacitor C is designated E3. It will be clear that E2 plus E3 must always equal E1. The voltage provided by source B is the bias required to give a "white" signal and under steady conditions is equal to E2. The voltage across R3 corresponding to white on the transmitter drum is normally larger than E2.

Assume that a document is fixed to the transmitter drum, printed on a base which is not pure white for which RV has been set, and that a test strip of pure white is provided at the commencement of the drum. If now the drum is started voltage E1 is a maximum, E3 is equal to the difference between E1 and E2, E2 is equal to voltage B and a steady white signal is transmitted until the scanning spot leaves the white test strip and begins to scan the base of the document, which is a darker tone. The illumination of photo-cathode 2 is then reduced and E1 falls correspondingly. Capacitor C at once begins to discharge through R2, source B and R3. The voltage drop across R2 now acts in opposition to voltage B and E2 is immediately reduced so that E2 plus E3 is equal to the reduced E1.

The voltage across capacitor C falls exponentially towards the point when E3 plus voltage B is equal to the reduced E1. At this point there is no current through R2 and E2 again equals voltage B. Thus E3 has been reduced by an amount corresponding to the reduction of E1 and E2 is at its original level so that the machine transmits a "white" signal for the new background tone.

When the scanning spot encounters a line or other mark on the original document voltage E1 is reduced by an amount corresponding to the tone of the mark and E2 is reduced as already described. Capacitor C at once begins to discharge but as soon as the scanning spot leaves the mark and returns to the background, voltage E1 returns to its normal "background" value and capacitor C is immediately re-charged through rectifier G2 until the original conditions are restored.

To give a numerical example, assume that the correct bias for a "white" signal is 3 volts, source B delivers 3 volts and the voltage across R3 is 4 volts for white and zero for black. If now a document is mounted on the transmitter drum having an off-white background tone corresponding to 3 volts across R3, then if the machine is first set to scan the test strip, E1 is 4 volts, E2 is 3 volts (being limited thereto by the rectifier G2) and E3 is 1 volt. When the scanning spot leaves the white test strip and encounters the background of the document, E1 falls to 3 volts and E2 falls to 2 volts since capacitor C is discharging through R2. As capacitor C is discharged E2 rises to 3 volts thus giving a "white" signal for the background. When the scanning spot encounters markings on the original E1 falls according to the tone of these marks and E2 falls correspondingly, (but is limited at zero volts by the rectifier G1, but E1 rises to 3 volts whenever the scanning spot returns to the background and E2 returns to the white level.

If the value of R3 is such that E1 is much higher than E2, then the range of tones in the original for which the transmitter signals intermediate tones is restricted and anything darker than this range is transmitted as black. For example, if E1 is 30 volts for white on the transmitter drum and a pure white test strip and a document are successively scanned, E1 is initially a steady 30 volts, E2 is 3 volts and E3 is 27 volts. Assuming, for example, that the off-white background of the document reduces E1 to 28 volts then the process already described occurs when the scanning spot encounters it and the transmitter eventually transmits a "white" signal for the new background, E3 being then 25 volts. When the scanning spot encounters markings on the document which cause a reduction in voltage E1 of less than 3 volts then by the process previously described the machine will transmit a signal ranging between white and black depending upon the voltage change in E1. If, however, a tone on the document is of sufficient depth to cause a voltage change in E1 of more than 3 volts then the voltage drop across R2 rises until it equals voltages B and G1 conducts thus rapidly discharging capacitor C. During this period the point X is practically at earth potential and the machine transmits a black signal. When the scanning spot returns to the background tone and E1 again rises to 28 volts capacitor C is rapidly charged through G2 to 25 volts and E2 again rises to 3 volts. Thus with this combination of voltages the machine automatically sets itself to transmit a white signal for any background tone and a signal ranging between white and black for tones in the original which produce a voltage change of up to 3 volts in R3, whilst everything darker than this is transmitted as black.

It will be clear that by an appropriate choice of circuit constants and voltages the machine may be made to transmit a full range of signals between white and black corresponding to any selected range of tones darker than the background level. For example, it may be set so that a message written in pencil on a grey base is received as a message written in full black on a pure white background.

The circuit and method of operation according to the invention has a further important advantage. It is well known to those familiar with the art that photo-electric multiplier cells are subject to "fatigue," that is to say, the sensitivity falls off immediately they are put into use, but they recover after a period of rest. The rate and the extent of this loss of sensitivity varies from cell to cell. Thus if a picture telegraph machine is switched on and a document having a white base is transmitted then the background of the reproduction is initially white and gradually becomes darker as transmission proceeds, due to the falling cell sensitivity. By using the circuit and method of operation according to the invention the background signal is continually corrected to "white" and the reproduction has a much more pleasing appearance.

If a completely black drum on the transmitter were scanned the signal initially transmitted would be black, but would gradually change to white. A similar effect would be produced by an original document having a black band covering its full width so that it forms a black ring on the transmitter drum. This effect may be avoided by arranging for the compensating circuit to be "reset" to "white" at intervals. The transmitter drum is always fitted with a longitudinal clamp by which the document is held and the signal is interrupted at each revolution. The period of necessary interruption of the "picture" signal is often used to transmit a synchronising signal which is employed to keep the moving parts of the receiver in mechanical synchronism with transmitter drum rotation. Where the circuit according to the present invention is employed a white strip may be attached to the clamp, or the equivalent of a white signal may be injected electrically into the compensating circuit during the interruption of the "picture" signal so that the circuit will "reset" itself to white at each revolution of the drum and will thus be ready to transmit a black signal when the scanning spot again encounters black on the document. The time constant of capacitor C and resistance R2 is chosen so that a complete change from black to white due to the discharge of capacitor C alone requires a number of revolutions of the transmitter drum and if the circuit is momentarily "reset" to white at each revolution the black tones are fully maintained. On the other hand, the change from white to black is governed entirely by the change in voltage across R3.

The foregoing description covers the application of the circuit according to the invention to a fascimile transmitter. One method of application is a receiver shown in the block schematic diagram of Figure 4. The receiver includes a local oscillator 4, a modulator 5 and an amplifier 6, which are similar to those in the transmitter. In the transmitter the amplified signal is either passed to the transmission line or to a radio transmitter. In the receiver, however, the signal is demodulated in demodulator 7 and the resulting D.C. signal applied directly to marking electrodes 8. The incoming signal to the receiver is amplified by amplifier 9 and applied to demodulator 10, which is arranged to provide a negative-going signal for white with respect to earth. This signal is thus a replica of the signal produced in the anode circuit of the photo-cell of the transmitter and is applied to the compensating circuit 11. Compensating circuit 11 and modulator 5 are as shown in Figure 2 with the omission of the photo-multiplier cell and potentiometer RV.

An alternative method of employing the compensating circuit in a receiver is shown in Figure 5. The incoming signal is amplified by amplifier 12 and then passed to demodulator 13 which is arranged to provide a negative-going signal for white with respect to earth and this is applied to the compensating circuit consisting of capacitor C, rectifiers G1 and G2, resistance R2 and battery B as in Figure 2. The compensated signal is then applied to a pure D.C. amplifier 14, the output of which is applied directly to the marking electrodes 15.

A third method of using the circuit according to the invention in a receiver is shown in Figure 6. The incoming signal is passed to amplifier 16 and thence to demodulator 17 which is arranged to provide a negative-going signal for white with respect to earth. It is then applied to the compensating circuit consisting of capacitor C, rectifiers G1 and G2, resistance R2 and battery B. The output signal is passed via grid resistance R4 to valve V3 which is shown as a 3-electrode valve although it will be understood that other types of output valve may be used. V3 has cathode resistor R5 to provide the correct initial bias (in conjunction with voltage source B) and anode load resistance R6. The H.T. current through valve V3 depends on the bias applied by the compensation circuit and the voltage drop across R6 is applied directly to the marking electrodes 18.

The circuit according to the invention is intended for use in transmitting matter in which the greater part of the area consists of a uniform background tone and it will be evident that owing to its simplicity switching means may easily be provided to cut it out when pictorial matter is to be transmitted.

Various modifications may be made within the scope of the invention.

I claim:

1. In a facsimile telegraph transmitter comprising a facsimile scanner and including photo-electric means and a modulator to produce a carrier modulated according to the light incident upon said photo-electric means, a compensating circuit comprising a common earth line, a first resistance connected between the output electrode of said photo-electric means and the common earth line, a capacitor connected between the output electrode of said photo-electric means and the modulator, two half-wave rectifiers connected in series, one terminal of the first of said two rectifiers connected to said common earth line, the two rectifiers connected in such a sense as to pass current towards said common earth line, a direct voltage source connected in parallel with said two rectifiers with its positive pole connected to said common earth line, and a second resistance, the value of the resistance of which is high in relation to the value of said first resistance, connected in parallel with the second of said two rectifiers, and the junction of said two rectifiers being connected to the side of said capacitor which is connected to said modulator.

2. In a facsimile telegraph transmitter, a compensating circuit as claimed in claim 1, in which the resistance connected to the output electrode of the photo-electric means and the common earth line is a potentiometer and the capacitor is connected between the slider of said potentiometer and the modulator.

3. In a facsimile telegraph receiver comprising a first amplifier and a first demodulator for the incoming signal, a local oscillator, a modulator fed by the local oscillator and controlled by the signal from said first demodulator, a second amplifier for the modulated signal and a second demodulator to provide a signal for facsimile recording, a compensating circuit comprising a common earth line, a capacitor connected between said first demodulator and said modulator, two half-wave rectifiers connected in series, one terminal of the first of said two rectifiers connected to the common earth line, the two rectifiers connected in such a sense as to pass current towards said common earth line, a direct voltage source connected in parallel with said two rectifiers with its positive pole connected to said common earth line, and a resistance connected in parallel with the second of said two rectifiers, and the junction of said two rectifiers being connected to the side of said capacitor which is connected to said modulator.

4. In a facsimile telegraph receiver comprising an amplifier for the incoming signal, a demodulator and a direct voltage amplifier to feed marking electrodes to produce a facsimile record, a compensating circuit comprising a common earth line a capacitor connected between said demodulator and said direct voltage amplifier, two half-wave rectifiers connected in series, one terminal of the first of said two rectifiers connected to the common earth line, the two rectifiers connected in such a sense as to pass current towards said common earth line, a direct voltage source connected in parallel with said two rectifiers with its positive pole connected to said common earth line, and a resistance connected in parallel with the second of said two rectifiers, and the junction of said two rectifiers being connected to the side of said capacitor which is connected to said direct voltage amplifier.

5. In a facsimile telegraph receiver comprising an amplifier for the incoming signal, a demodulator and an output valve connected as an anode follower and feeding marking electrodes to produce a facsimile record, a compensating circuit comprising a common earth line, a grid resistance of said output valve, a capacitor connected between said demodulator and the bottom end of the grid resistance, two half-wave rectifiers connected in series, one terminal of the first of said two rectifiers connected to said common earth line, the two rectifiers connected in such a sense as to pass current towards said common earth line, a direct voltage source connected in parallel with said two rectifiers with its positive pole connected to said common earth line, and a resistance connected in parallel with the second of said two rectifiers, and the junction of said two rectifiers being connected to the side of said capacitor which is connected to said grid resistance.

References Cited in the file of this patent

UNITED STATES PATENTS

| | | |
|---|---|---|
| 2,173,497 | Schlesinger | Sept. 19, 1939 |
| 2,545,463 | Hester | Mar. 20, 1951 |
| 2,724,738 | Babbs | Nov. 22, 1955 |
| 2,730,567 | McConnell | Jan. 10, 1956 |

OTHER REFERENCES

Seely: "Electron Tube Circuits," McGraw Hill, 1950, N.Y. (Examiner's personal copy Division 16) page 136.